(12) United States Patent
Zavaljevski et al.

(10) Patent No.: US 6,807,293 B2
(45) Date of Patent: Oct. 19, 2004

(54) METHOD FOR MULTI-PATH RENDERING OF MEDICAL IMAGES

(75) Inventors: Aleksandar Zavaljevski, Waukesha, WI (US); David M. Deaven, Waukesha, WI (US); Christopher J. Mussack, Waukesha, WI (US)

(73) Assignee: GE Medical Systems Global Technology Company, LLP, Waukesha, WI (US)

( * ) Notice: Subject to any disclaimer, the term of this patent is extended or adjusted under 35 U.S.C. 154(b) by 572 days.

(21) Appl. No.: 09/681,399

(22) Filed: Mar. 29, 2001

(65) Prior Publication Data

US 2002/0141623 A1 Oct. 3, 2002

(51) Int. Cl.7 .................................................. G06K 9/00
(52) U.S. Cl. ...................................................... 382/128
(58) Field of Search ................................ 382/128, 276, 382/279, 297, 302; 348/77, 254, 674; 378/63, 87; 250/370.08, 370.09

(56) References Cited

U.S. PATENT DOCUMENTS

| 5,125,043 A | * | 6/1992 | Karlsson ..................... 382/300 |
| 5,263,099 A | * | 11/1993 | Kapcio et al. .............. 382/131 |
| 5,384,602 A | * | 1/1995 | Bossaert et al. ............ 348/628 |
| 5,447,153 A | * | 9/1995 | Weil et al. .................. 600/300 |
| 5,471,989 A | * | 12/1995 | Roundhill et al. .......... 600/440 |
| 5,608,774 A | * | 3/1997 | Polichar et al. ............ 378/98.8 |
| 5,671,359 A | * | 9/1997 | Godlewski et al. ............ 705/3 |
| 5,740,267 A | * | 4/1998 | Echerer et al. ............. 382/132 |
| 5,877,819 A | * | 3/1999 | Branson ..................... 348/701 |
| 5,930,407 A | * | 7/1999 | Jensen ........................ 382/300 |
| 2002/0109735 A1 | * | 8/2002 | Chang et al. ............... 345/853 |
| 2002/0114530 A1 | * | 8/2002 | Duarte ....................... 382/254 |
| 2003/0026503 A1 | * | 2/2003 | Kallergi et al. ............. 382/299 |

* cited by examiner

*Primary Examiner*—Andrew W. Johns
*Assistant Examiner*—Shervin Nakhjavan
(74) *Attorney, Agent, or Firm*—Quarles & Brady LLP; Carl Horton (57) ABSTRACT

A method and system are disclosed for rendering medical images for display on a medical imaging system. The method includes acquiring an image data set by way of an acquisitioning system, and entering a special mode of operation that is either an interactive mode of operation or a repetitive series rendering mode of operation. The method further includes pre-calculating pixel values based upon the image data set, and displaying an image on an output device based upon the pre-calculated pixel values. The method additionally includes altering at least one aspect of the displayed image, wherein the altered displayed image continues to be based upon the pre-calculated pixel values.

15 Claims, 11 Drawing Sheets

METHOD FOR MULTI-PATH RENDERING OF MEDICAL IMAGES

BACKGROUND OF INVENTION

The field of the invention is medical imaging methods and systems. More particularly, the invention relates to a method of more rapidly displaying medical images on the screen(s) or other output interfaces of medical imaging system(s).

Medical imaging systems are among the most important tools of doctors in diagnosing their patients. A variety of different types of medical imaging systems have been developed such as magnetic resonance imaging (MRI) systems, CT scanning systems and positron-emission tomography (PET) scanner systems, to name a few. Depending upon the type of medical images that are required to diagnose a patient, one or more of these different systems can be employed.

Although these different types of medical imaging systems operate based upon different principles, the systems are similar in that each of the systems acquire, process, and eventually produce and display images based upon large amounts of data. Consequently, to effectively produce and display images in a manner that is useful to doctors or other operators, these systems require a great amount of processing power and speed.

Further, although the processing that must be performed by the different types of medical imaging systems in order to generate images varies from system to system insofar as the different systems acquire different types of data and acquire their data in different manners, the different types of medical imaging systems share in common similar processing operations for properly formatting and configuring the images for display on a screen. That is, the final, image processing operations performed by the different types of medical imaging systems are largely the same for the different types of medical imaging systems.

Though important to a variety of different types of medical imaging systems, the image processing operations often require such significant amounts of processing that the operations restrict the speed at which doctors or other operators can bring up and look at different images. This is particularly the case in medical imaging systems that allow operators to provide repeated input commands (e.g., by way of a mouse) to vary different characteristics of the images. For example, some medical imaging systems now allow an operator to vary any one of the window/level, position (or pan), or zoom of a particular image being displayed, merely by pressing a button in an interactive mode of operation. Additionally, some medical imaging systems allow an operator to command that a series of related images be displayed in rapid sequence.

In each of these cases, conventional methods of image processing can restrict the speed and ease with which an operator can view or modify the display of images. In the case where the operator is viewing the images in an interactive mode, conventional methods of image processing require such large amounts of processing that there can exist a significant time delay between the times at which an operator provides a particular command and at which a resulting change in the displayed image occurs. Not only can such time delays be inconvenient and annoying to an operator, but also such time delays can make it difficult for an operator to bring about desired images on the screen. In particular, the operator can sometimes provide an excessive number of commands that result in an "overshooting" of the desired image because the operator does not have a clear, immediate indication of whether the system has accepted and responded to the operator's previous commands.

Further with respect to the rapid sequential display of a series of related images, conventional methods of image processing tend to restrict the rapidity at which the series of images can be displayed, due to the large amount of processing that is required. When the rate at which the series of images is displayed decreases, the value to the operator of viewing the series of images can be reduced since patterns of changes in the images with respect to one another can become less apparent to the operator.

It would therefore be advantageous if a new method of image processing could be developed for implementation in medical imaging systems that increased the speed at which the medical imaging systems could process and display images. In particular, it would be advantageous if the new method of image processing improved the speed at which images could be processed and displayed in response to commands provided by an operator in an interactive mode of operation, for example, commands to adjust the window/level, position, or zoom of an image. Additionally, it would be advantageous if the new method of image processing improved the speed at which a series of related images could be sequentially displayed.

SUMMARY OF INVENTION

The present invention relates to a method for rendering medical images for display on a medical imaging system. The method includes acquiring an image data set by way of an acquisitioning system, and entering a special mode of operation that is either an interactive mode of operation or a repetitive series rendering mode of operation. The method further includes pre-calculating pixel values based upon the image data set, and displaying an image on an output device based upon the pre-calculated pixel values. The method additionally includes altering at least one aspect of the displayed image, wherein the altered displayed image continues to be based upon the pre-calculated pixel values.

The present invention further relates to a method for rendering medical images for display on a medical imaging system. The method includes determining whether a specialized mode of operation has been commanded. The specialized mode is selected from the group consisting of an interactive window/level rendering mode, an interactive position rendering mode, an interactive zoom rendering mode, and a repetitive series rendering mode. The method additionally includes, if a specialized mode of operation has been commanded: pre-calculating pixels; displaying an image based upon the pre-calculated pixels; and altering the displayed image based upon a command, wherein the altered displayed image is still based upon the pre-calculated pixels. The method further includes, if a specialized mode has not been commanded, generating a standard image in accordance with a standard mode.

The present invention additionally relates to a system for rendering medical images for display on a medical imaging system. The system includes an acquisitioning system, a processing system, and an imaging system. The processing system is coupled to the acquisitioning system, and the processing system generates a preliminary image data set based upon data from the acquisitioning system. The imaging system is coupled to the processing system, is capable of generating and displaying images based upon the preliminary image data set, and is capable of entering a specialized mode of operation in response to a command. When the imaging system enters into the specialized mode, the imaging system pre-calculates pixels based upon the preliminary image data set and further performs a secondary operation to generate and display a first image. When the imaging system is operating in the specialized mode, the imaging system is capable of generating and displaying an altered version of the first image based upon the pre-calculated pixels.

The present invention further relates to a system for rendering medical images for display on a medical imaging system. The system includes an acquisitioning system for obtaining data based upon which an image can be generated and a database for storing the obtained data. The system also includes a processing system for processing the obtained data to generate a preliminary image data set, an output device for outputting the image, and an input device capable of receiving commands. The processing system is capable of responding to a first command from the input device by entering into a specialized mode of operation, pre-calculating pixels based upon the preliminary image data set, performing a secondary operation to generate the image, and reperforming the secondary operation to generate an altered version of the image.

DETAILED DESCRIPTION

Figure 1:
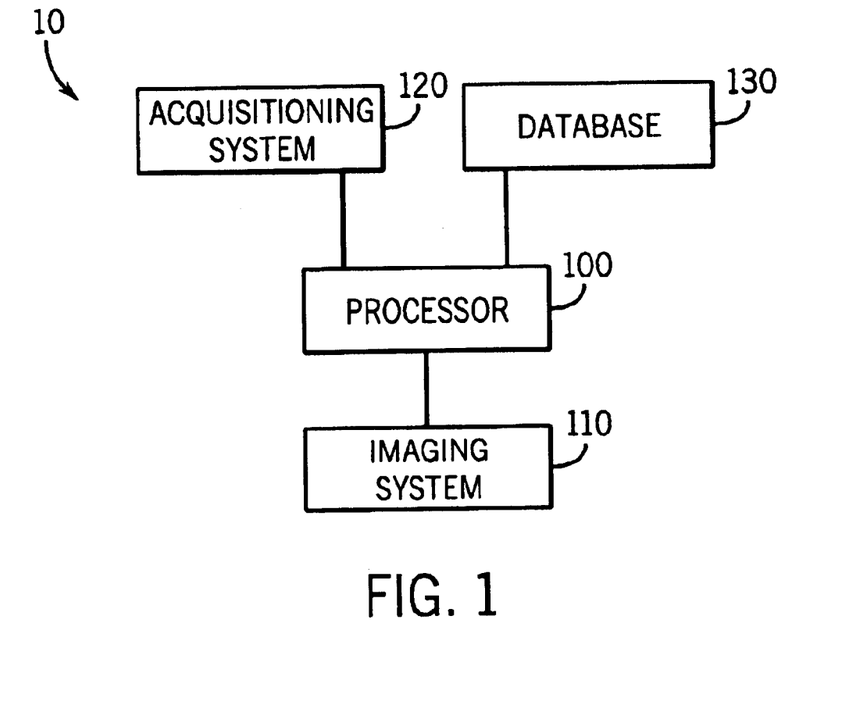
FIG. 1 is a block diagram of a medical imaging system which employs the present invention.

Referring to FIG. 1, the major components of an exemplary medical imaging system 10 are shown to include a processor 100 that is coupled to an imaging system 110, an acquisitioning system 120 and a database 130. The medical imaging system 10 is representative of a variety of different types of medical imaging systems that operate based upon different principles of operation, including magnetic residence imaging (MRI) systems, CT scanning systems, and positron-emission tomography (PET) scanner systems. In the exemplary medical imaging system 10, information regarding the status of a patient is obtained by way the acquisitioning system 120. This scanned-in data is processed by the processor 100 to obtain image data. For example, in the case of a MRI system, data that is acquired by way of RF coils in a scanner is processed by an array processor to transform the data into an array of image data. Once image data has been determined by the processor 100, this image data can be stored in the database 130 for future access. Also, at that time or at a later time, the image data can be provided to the imaging system 110, which displays images based upon the imaged data on a computer screen or other output device (not shown).

The exact image(s) that are displayed by the imaging system 110 can vary significantly depending upon a variety of factors. In particular, the exact images that are displayed can depend upon commands provided from an operator by way of a mouse, keyboard or other input device (not shown) of the imaging system 110, by which the operator can indicate that certain images, sections of images or changes in the manner in which the images are being displayed are desired. A first common image selection command that can be provided by an operator is to vary the window/level of the image. By providing different commands in this regard, the operator can influence the relationship between the actual strength or intensity of the output of the various pixels on the display and the strength of the corresponding pixel values in the image data. In this regard, the operator is able to vary two parameters, a window width parameter (W) and a window level parameter (L). By varying the value L, the operator sets the range of values of the input pixel data (in terms of strength or intensity), from zero up to the value of L, up to which the strength of the corresponding output pixels will be maintained at a minimum value.

By setting the value of W, the operator further specifies the range of values of the input pixels, from L−W up to L+W, over which variations in the strength of the input pixels will cause corresponding increases in the strength of the output pixels. Upon the input pixel values reaching a value of L+W, continued increases in the strength of the input pixel values does not cause continued increases in the strength of the output pixel values, and the output pixel values remain at a maximum value. Although typically the values of the output pixels vary linearly with changes in the values of the input pixels when the values of the input pixels are within the range between L−W and L+W, such that the overall relationship between the strength of the input pixels and the strength of the output pixels is piecewise linear, in other embodiments, the relationship between the input pixel values and the output pixel values can take a different form (e.g. a nonlinear form). By varying the values of L and W, therefore, an operator can vary the intensity of different aspects of an image to allow for greater clarity of display of certain features in the images.

Other commands that can be provided by an operator to vary the display of images by the imaging system 110 can include commands to vary the positioning, or pan, of an image being displayed on the screen or the level of zoom at which an image is displayed. By providing commands to vary the pan of an image, different sections of the image can be displayed on the screen while other sections are not shown, to allow the operator to focus on desired sections of the image. By providing commands to increase or decrease the level of zoom at which an image is displayed, the operator can respectively view particular sections of the image in greater detail or view greater portions of the image in less detail. Additionally, in some medical imaging systems, an operator can provide commands causing the imaging system 110 to display in relative rapid sequence a series of related images that correspond to successive, adjacent slices or layers of an object being imaged. Often, by performing such a repetitive series rendering of images, the operator is able to more clearly observe changes or trends in characteristics of the object (e.g. organs) being studied.

Figure 2:
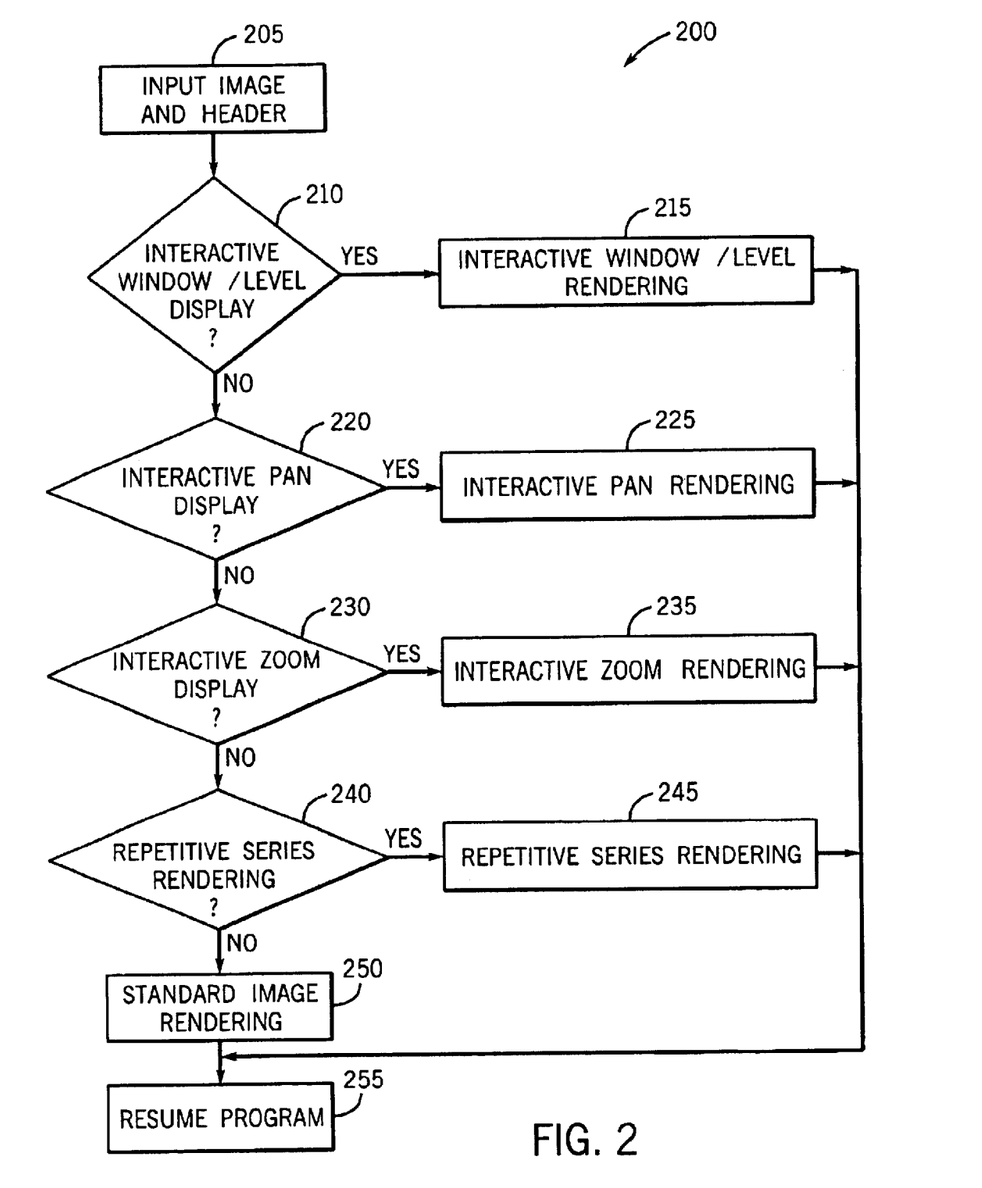
FIG. 2 is a flow chart showing exemplary steps of operation of the medical imaging system of FIG. 1 in accordance with one embodiment of the present invention.

Turning to FIG. 2, a flow chart 200 shows exemplary steps of operation of the imaging system 110 of FIG. 1 that allow the imaging system to more rapidly respond to commands of an operator to vary the display of an image or images to better display desired aspects of those images. In particular, the steps allow for the imaging system 110 to more rapidly change window/level, pan, or zoom characteristics of a displayed image in response to commands from an operator than would be the case using conventional operational techniques. Additionally, the steps of flow chart 200 allow for the more rapid display of images in the manner of a repetitive series rendering of images. The steps also allow for standard image rendering where no special commands are provided by the operator.

As shown in FIG. 2, the steps of operation of the imaging system 110 begin at step 205 when an image (e.g., the data for an image) and a header (e.g., descriptive of the image) are input to the imaging system for display. The image and header can be input in response to a command by the operator to display a particular image, or can occur in response to a command of the processor 100. Upon the input of an image and a header, the imaging system 110 inquires as to whether there has been a command from the operator requesting that the imaging system enter an interactive window/level rendering mode of operation at step 210. Such a command can be as simple as a command by the operator that the current window/level values be changed or that the image be displayed in accordance with particular values of window/level. If such a command is received, the imaging system 110 proceeds to operate in an interactive window/level rendering mode of operation at step 215, which is described further below with respect to FIGS. 4 and 5.

If no command is received concerning window/level, the imaging system 110 next determines at step 220 whether the imaging system has received a command to enter an interactive pan rendering mode of operation. Again, such a command can be as simple as a command from the operator (or the processor 100) that a particular new positioning of an image be displayed on the screen. If such a command is received, then at step 225 the imaging system 110 proceeds to operate in an interactive pan rendering mode, which is described in greater detail with respect to FIGS. 6 and 7. If no such command is received, the imaging system 110 proceeds to step 230, at which it is determined whether a command has been received requesting that the imaging system enter an interactive zoom rendering mode of operation. Again, such a command can be as simple as a command requesting a change in the current level of zoom at which an image is currently being displayed on the screen. If such a command is received, then at step 235 the imaging system 110 proceeds to operate in an interactive zoom rendering mode, which is discussed in greater detail with respect to FIGS. 8 and 9.

If such a command is not received, then the imaging system 110 proceeds to step 240, at which it is determined whether a command has been received to perform a repetitive series rendering of images. If such a command has been received, the imaging system proceeds to operate in a repetitive series rendering mode at step 245, which is discussed in greater detail with respect to FIGS. 10 and 11. If no such command is received, the imaging system 110 proceeds to step 250, at which it proceeds to operate in (or remains operating in) a standard image rendering mode, in which the current image is displayed in a normal fashion. Once the imaging system 110 has completed its display of image(s) in accordance with the particular mode of operation that has been selected, namely, the interactive window/level rendering mode, the interactive pan rendering mode, the interactive zoom rendering mode, the repetitive series rendering mode, or the standard image rendering mode, in accordance with steps 215, 225, 235, 245, or 250, respectively, the imaging system 110 has completed its display and returns at block 255 to whatever program it was previously performing prior to the execution of step 205.

Figure 3:
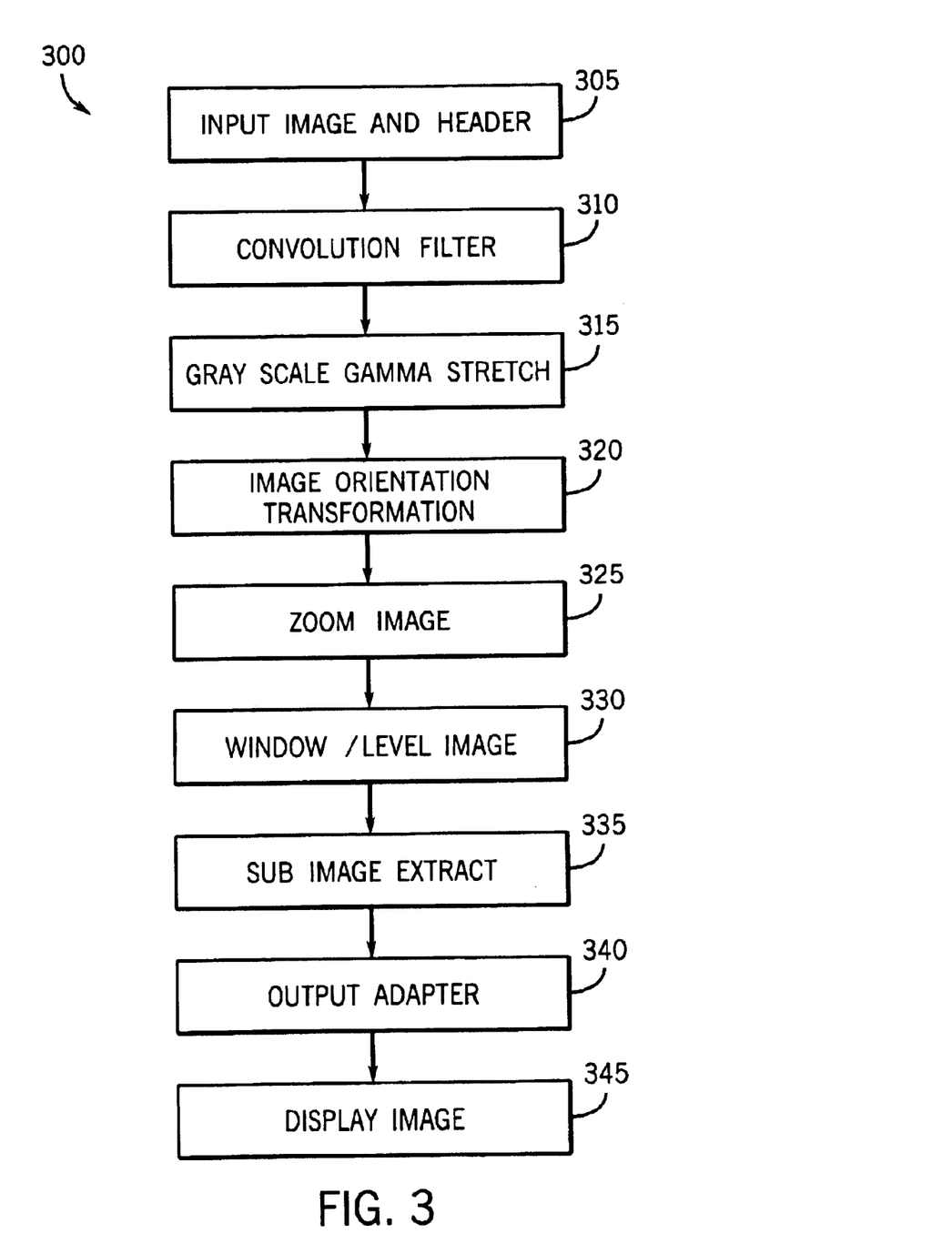
FIG. 3 is a flow chart showing exemplary steps of operation of the medical imaging system of FIG. 1 when operating in a standard image rendering mode of operation.

Turning to FIG. 3, a flow chart 300 shows steps of operation performed by the imaging system 110 when it is displaying an image in accordance with the standard image rendering mode of operation of step 250. As shown in block 305, the image and header inputs are used for performing the steps of flow chart 300. At step 310, the input image data is processed by way of a convolution filter; that is, in this step, the imaging system 110 applies a convolution filter kerneled to the input pixels. Filters of sizes 3*3, 5*5, and 7*7 centered in the input pixels are typically used. Then, at step 315, a gray scale gamma stretch operation is performed, which transforms the values of the input pixels according a gamma correction function. Values for the gamma correction function are calculated in advance and stored in lookup tables (not shown), which are used to perform the transformation.

Next, at step 320, an image orientation transformation is performed. The image orientation transformations can include simple orientation transformations such as 90 degree, 180 degree and 270 degree clockwise or counterclockwise, rotations of an image, as well as flips of the image across a horizontal or vertical axis. Next, at step 325, the imaging system 110 performs a zoom image operation that causes the image to be displayed at the appropriate zoom level, which typically will have been previously set or is set to a standard level. The appropriate zoom level providing the appropriate level of magnification or minification of an image can be applied by the imaging system by way of bilinear or bicubic interpolation methods. Then, at step 330, the imaging system 110 also applies the appropriate window/level of the image, typically according to the piecewise linear functional relationship described above. Each of the appropriate orientation, zoom level, and window/level settings in the standard rendering mode are typically set at standard levels or at levels previously specified by the operator or a system device (e.g., by a command from the processor 100 indicating that a particular image should be displayed in a particular manner).

Next, at step 335, the imaging system 110 performs a sub image extract operation, at which the imaging system extracts the appropriate part of the transformed input image (corresponding to a particular pan level) that is supposed to be displayed on the output terminal of the imaging system (e.g., the screen). At step 340, then, the pixels corresponding to the extracted part of the transformed input image are adapted to the particular specifications or requirements of the particular output device. Scale and bias operations can be performed in this regard. Finally, at step 345, the image is displayed on the output device, and the imaging system 110 proceeds then to step 255.

Turning to FIGS. 4–11, in contrast to the steps of flow chart 300 that are performed when the imaging system 110 is operating in the standard rendering mode, effectively two separate sets of steps are performed by the imaging system whenever the imaging system is operating in any one of the interactive window/level rendering mode, the interactive pan rendering mode, the interactive zoom rendering mode, or the repetitive series rendering mode. In each of FIGS. 4, 6, 8, and 10, operation in each of these modes includes both a set of steps involving pre-calculation of pixels and also a second set of steps that are performed, possibly repetitively, after the pre-calculation of pixels. By pre-calculating pixels in each of these modes of operation, the imaging system 110 performs at least some of the steps required for producing images in accordance with the particular mode of operation only once, even though particular other steps in generating the images can be performed repetitively while the imaging system remains in that particular mode of operation. By first performing all of the operations that only need be performed once during a particular mode of operation, the imaging system 110 is able to update or modify the particular image characteristics that need to be modified in the given mode of operation at a more rapid pace than would otherwise be possible, because only the bare minimum number of steps that are required to update the images are repeatedly performed.

Figure 4:
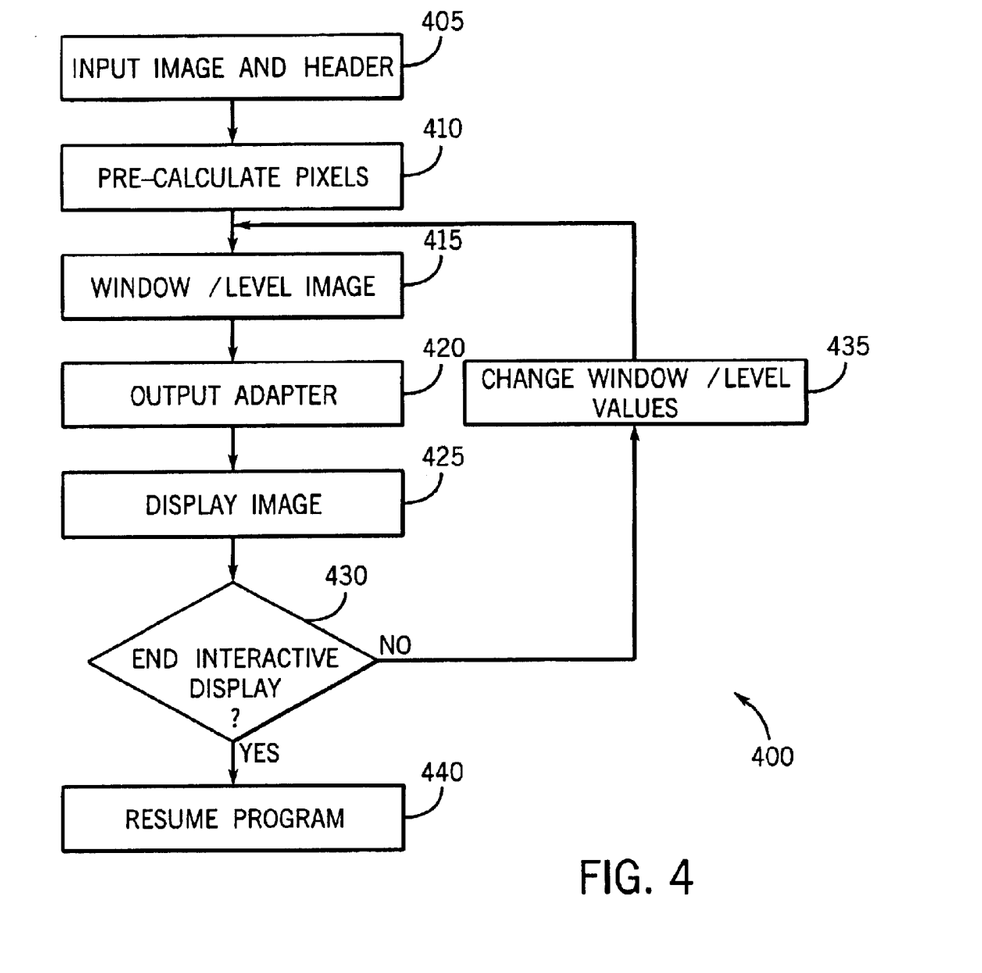
FIG. 4 is a flow chart showing exemplary steps of operation of the medical imaging system of FIG. 1 when operating in an interactive window/level rendering mode of operation.
Figure 5:
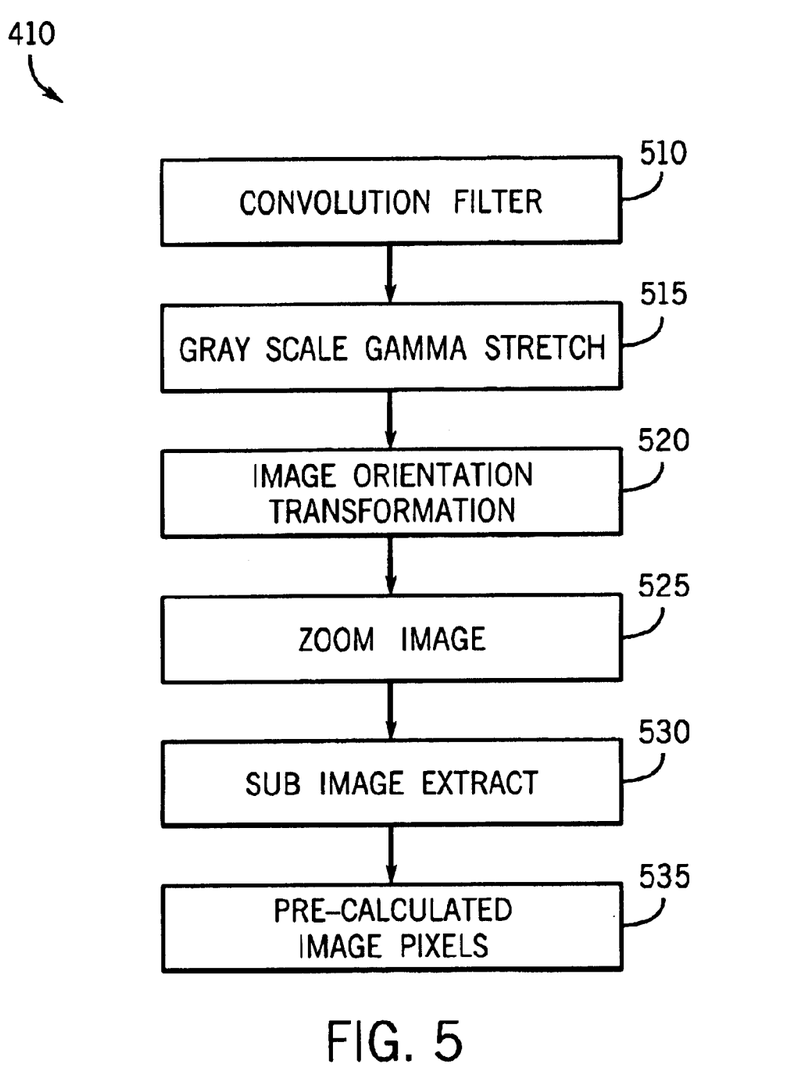
FIG. 5 is a flow chart showing additional exemplary steps of operation of the medical imaging system of FIG. 1 when operating in the interactive window/level rendering mode.

Specifically with respect to FIG. 4, upon entering the window/level mode of operation of step 215, the imaging system 110 performs a pre-calculation of pixels at step 410. In order to perform the pre-calculation, the image and header information is utilized, as indicated by block 405. Referring to FIG. 5, the specific steps that are performed to pre-calculate pixels in step 410 of the interactive window/level rendering mode include the steps of an additional flow chart 500. The pre-calculation steps of flow chart 500 include performing a convolution filter operation at step 510 (effectively the same operation as discussed with respect to step 310), a gray scale gamma stretch operation at step 515 (effectively the same as the operation performed at step 315), an image orientation transformation at step 520 (effectively the same operation as performed at step 320), a zoom image operation at step 525 (effectively the same operation as at step 325), and a sub image extract operation at step 530 (effectively the same operation as at step 335). Once these steps are performed, the pre-calculation of image pixels is completed as indicated by block 535. All of these operations at steps 510–530 only need to be performed once when the imaging system 110 enters the interactive window/level mode of operation because none of these characteristics repetitively change once the imaging system has entered and then remains in the interactive window/level mode of operation.

Returning to FIG. 4, although the steps performed in pre-calculating pixels at step 410 need only be performed one time after the imaging system 110 has entered the interactive window/level mode of operation, the remaining steps in this mode of operation can be, and typically are, repeated more than once. As shown, after the pre-calculation of pixels at step 410, the imaging system 110 proceeds to step 415, at which the window/level setting of the image is determined based upon the most recently received command concerning window/level. Then at step 420, the values of the pixels are adapted to the specifications of the output device (as discussed with respect to step 340), and then at step 425 the image is displayed with the particular desired window/level settings. Further as shown at step 430, once the imaging system 110 is in the interactive window/level rendering mode of operation, the imaging system can remain in this mode of operation and repeatedly redisplay the image with varying window/level settings. That is, unless the imaging system 110 receives a command indicating that the imaging system should exit the interactive window/level rendering mode of operation, the imaging system continues to remain in that mode.

If, while the imaging system 110 is in the interactive window/level rendering mode of operation, an additional command is received indicating that the image should be redisplayed at a new window/level setting, the imaging system proceeds to step 435, at which the particular window/level values are adjusted, and then returns to step 415, at which the new window/level setting is applied to the image. Then the system repeats steps 420 and 425 to display the image with the new window/level setting. Thus, once the imaging system 110 has entered the interactive window/level rendering mode, an operator or other system device (e.g., processor 100) can repeatedly provide new commands for new window/level settings to cause updated versions of the image having such new window/level settings to be displayed on the output device. Because many of the operations for displaying the image are already performed during the pre-calculation of pixels at step 410, this redisplaying of the image at different window/level settings can occur much more rapidly in response to the commands of the operator or other system device than would be the case in conventional systems.

Once the imaging system 110 receives a command indicating that the interactive window/level rendering mode of operation is no longer desired, the imaging system exits the interactive window/level rendering mode and returns to its previous operations at block 225, as indicated by block 440. One occurrence that can cause the imaging system 110 to exit the interactive window/level rendering mode of operation is a new command from the operator or other system device to adjust a different characteristic of the image than the window/level setting, e.g., the pan level or the zoom level, or a command to enter a different mode of operation such as the repetitive series rendering mode of operation or the standard image rendering mode of operation.

Figure 6:
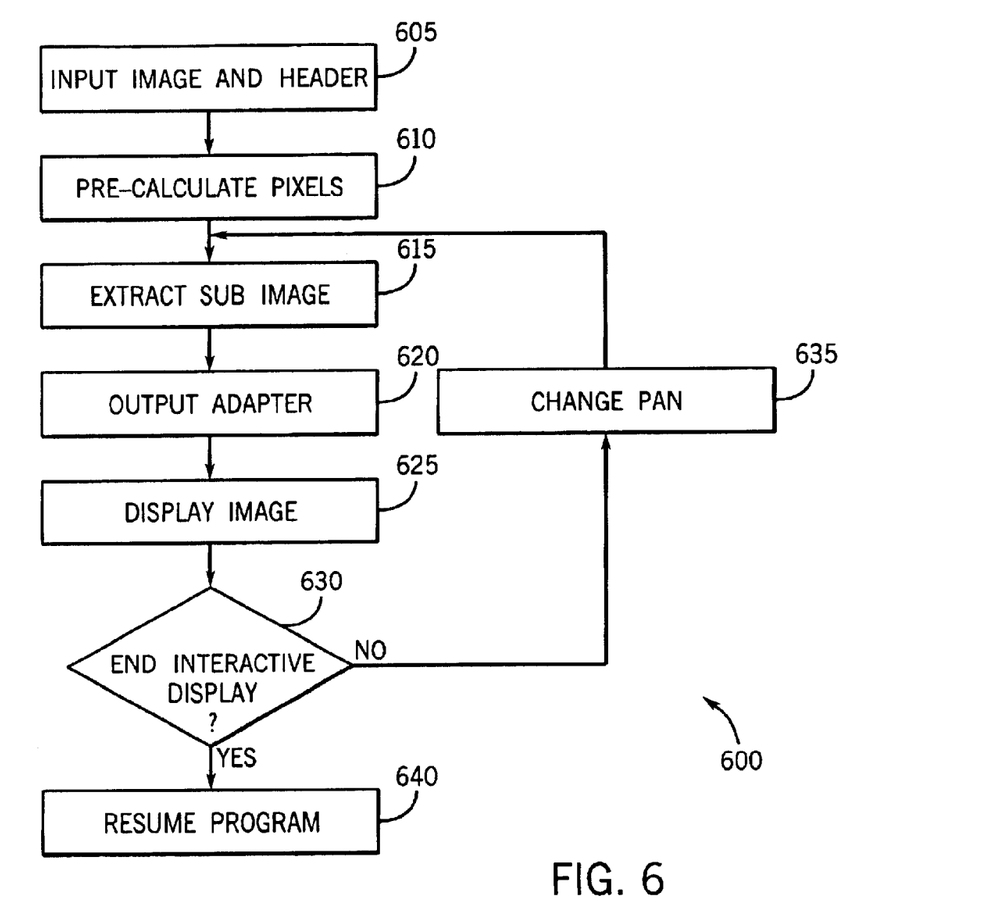
FIG. 6 is a flow chart showing exemplary steps of operation of the medical imaging system of FIG. 1 when operating in an interactive pan rendering mode of operation.
Figure 7:
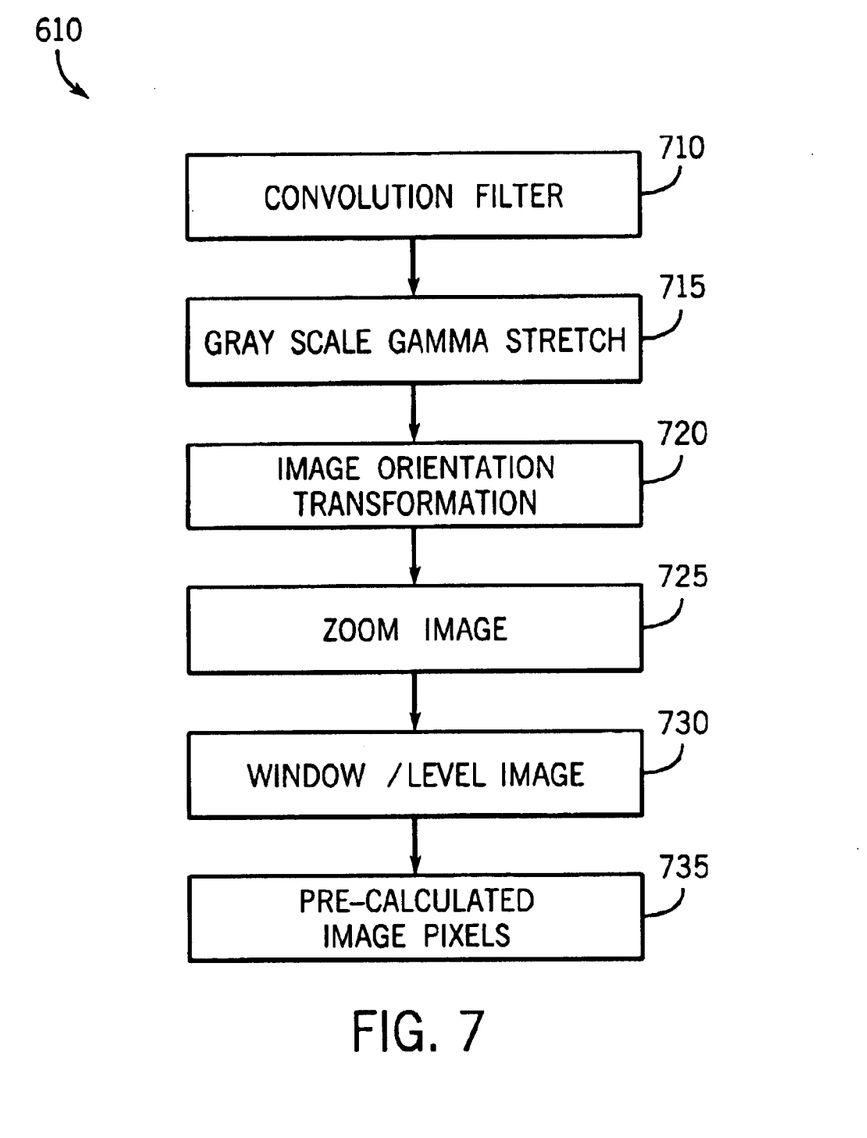
FIG. 7 is a flow chart showing additional exemplary steps of operation of the medical imaging system of FIG. 1 when operating in the interactive pan rendering mode.

Turning to FIG. 6, the imaging system 110 similarly performs two sets of steps in the interactive pan rendering mode of step 225. First, using the inputted image and header information (as indicated by block 605), the imaging system pre-calculates pixels at step 610. As shown in FIG. 7, the pre-calculation of pixels includes the performing of a convolution filter operation at step 710, a gray scale gamma stretch operation at step 715, an image orientation transformation at 720, a zoom image operation at step 725, and a window/level image operation at step 730, at which point the pre-calculation of pixels is completed as indicated by block 735. Each of the operations of steps 710–730 are respectively the same as those of steps 310–330 of FIG. 3. Upon completion of the pre-calculation of pixels at step 610, the imaging system 110 proceeds to a second set of steps that are performed in the interactive pan rendering mode. At step 615, an extract sub-image operation is performed that corresponds to step 335 described above. Thus a particular portion of the image is selected for display that corresponds to a particular starting pan or position setting, which can be either a nominal or starting value, or the previous pan setting specified by the operator or some system device. Then at step 620, an output adapter operation is performed that corresponds to step 340, at which the values of the pixels are adapted to the specifications of the particular output device, and at step 625 the image is displayed.

Once the imaging system 110 has entered the interactive pan rendering mode of operation, the imaging system remains in that mode until the imaging system receives a command to leave that mode of operation. While in the interactive pan rendering mode of operation, the imaging system 110 can receive additional commands from the operator or another system device indicating that the pan of the image should again be changed, at step 635. Upon receiving such a command, steps 615 through 625 are repeated to display an image with the updated pan setting on the output device. Because, in accordance with flow chart 600, all of the operations for generating images except for the bare minimum of operations required for adjusting the pan of the displayed image are performed only once during the pre-calculation of pixels at step 610, the imaging system 110 can repeatedly update the displayed image with different pan settings in a rapid manner in response to repeated commands from the operator or a system device to change the pan. Once a command is received indicating that the imaging system 110 should leave the interactive pan rendering mode, the system exits the mode and returns to its previous operational program, as indicated by block 640. Again, the occurrences that can cause the imaging system 110 to leave the interactive pan rendering mode can include a command from the operator or a system device requesting a change in a different characteristic of the image other than the pan of the image, such as the window/level setting or the zoom level of the image, or a change in the mode of operation.

Figure 8:
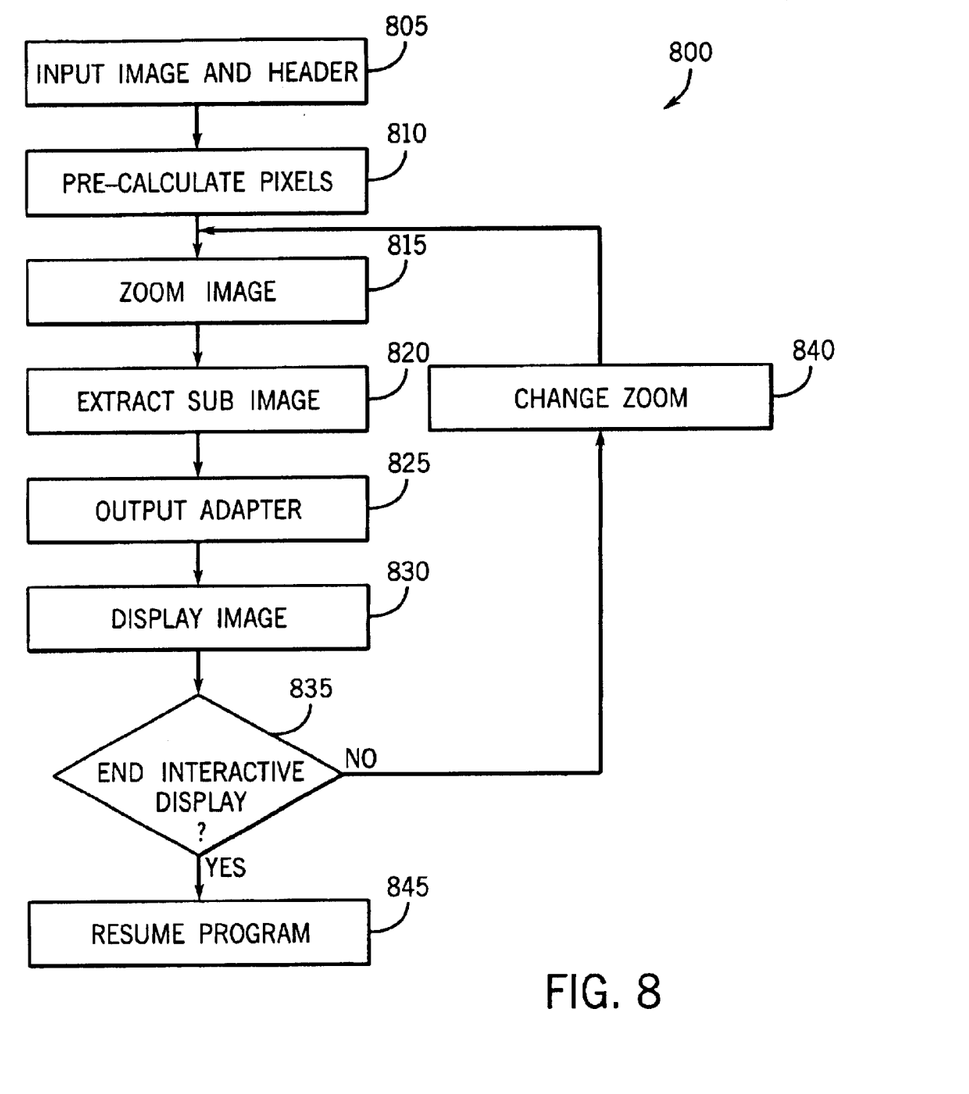
FIG. 8 is a flow chart showing exemplary steps of operation of the medical imaging system of FIG. 1 when operating in an interactive zoom rendering mode of operation.
Figure 9:
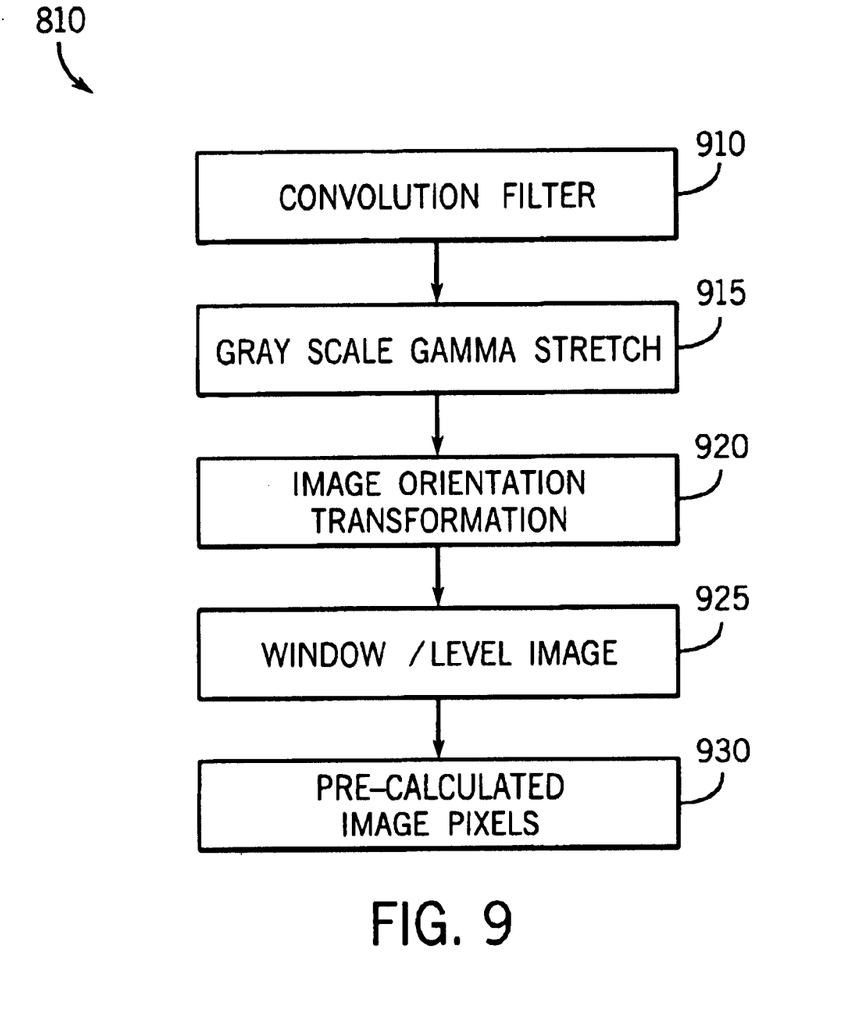
FIG. 9 is a flow chart showing additional exemplary steps of operation of the medical imaging system of FIG. 1 when operating in the interactive zoom rendering mode.

Turning to FIG. 8, another flow chart 800 is shown that again includes two sets of steps, which in this case are performed when the imaging system 110 enters the interactive zoom rendering mode of operation of step 235. As in the case of the flow charts 400, 600 of FIGS. 4 and 6, respectively, the flow chart 800 first includes the pre-calculation of pixels at step 810, which requires the use of the inputted image and header information as indicated by block 805. Referring to FIG. 9, the pre-calculation step 810 includes a convolution filter operation 910, a gray scale gamma stretch operation at step 915, an image orientation transformation at step 920, and a window/level image operation at step 925, at which point the pre-calculation of image pixels is completed as indicated by block 930. Each of the operations of steps 910–925 are the same as those of steps 310, 315, 320 and 330, respectively. After completing the pre-calculation of pixels at step 810, the imaging system 110 determines the zoom level of the image at step 815. Upon first entering the interactive zoom rendering mode, the current zoom level is either a standard zoom level (e.g., 100%), or is the previous zoom level set by the operator or a system device.

After setting the zoom level at step 815, the imaging system 110 then performs an extract subimage operation at step 820, adapts the values of the pixels to the specifications of the particular output device in an output adapter operation at step 825, and then finally displays the image with the particular zoom level at step 830. Then at step 835, it is determined whether a command has been received to end the interactive zoom rendering mode of operation. If no such command is received, the imaging system 110 remains in the interactive zoom rendering mode of operation. While remaining in this mode of operation, the imaging system 110 can receive additional commands from the operator or a system device to change the zoom level to another level at step 840. If such commands are received, the imaging system redetermines the zoom level of the image at step 815 and then reperforms steps 820–830 to generate a new displayed image with a changed zoom level. Because all steps for generating images aside from the bare minimum of steps required to adjust the zoom level of the displayed images are performed in pre-calculation step 810, the displayed image can be repeatedly adjusted in response to commands to change the zoom level at a more rapid pace than would otherwise be the case using conventional methods. If at step 835 the imaging system 110 receives a command to end the interactive zoom rendering mode of operation, then the imaging system returns to the program that it was previously operating prior to entering this mode of operation, as indicated by block 845. The imaging system 100 can exit the interactive zoom rendering mode in response to a variety of occurrences, including a command of an operator or a system device to change a window/level or pan setting of the image, or a command of an operator or a system device to enter a different mode of operation.

Figure 10:
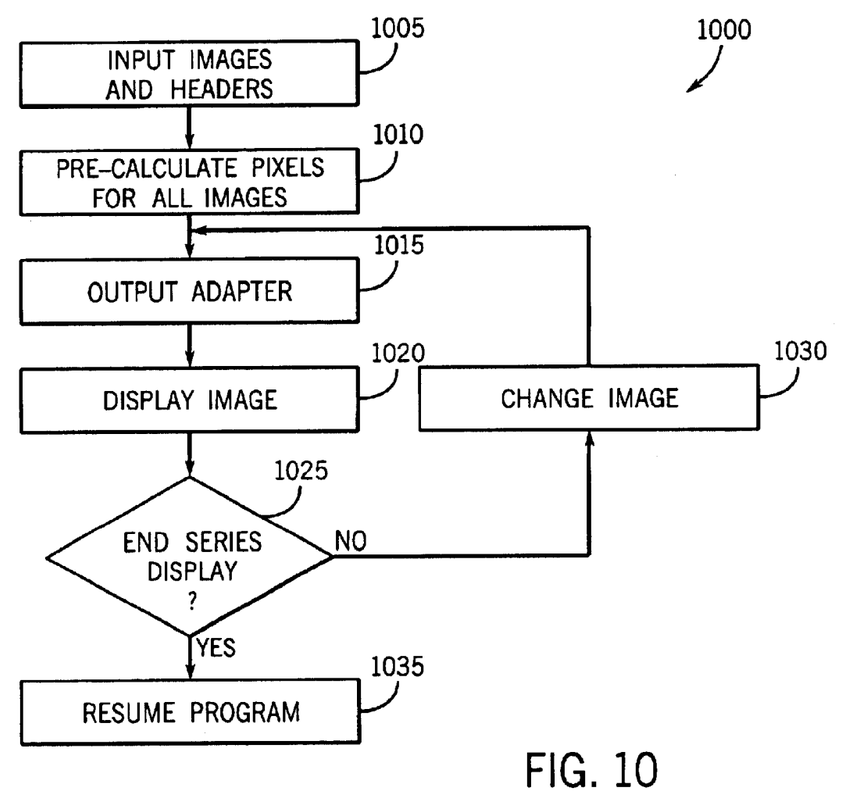
FIG. 10 is a flow chart showing exemplary steps of operation of the medical imaging system of FIG. 1 when operating in a repetitive series rendering mode of operation.
Figure 11:
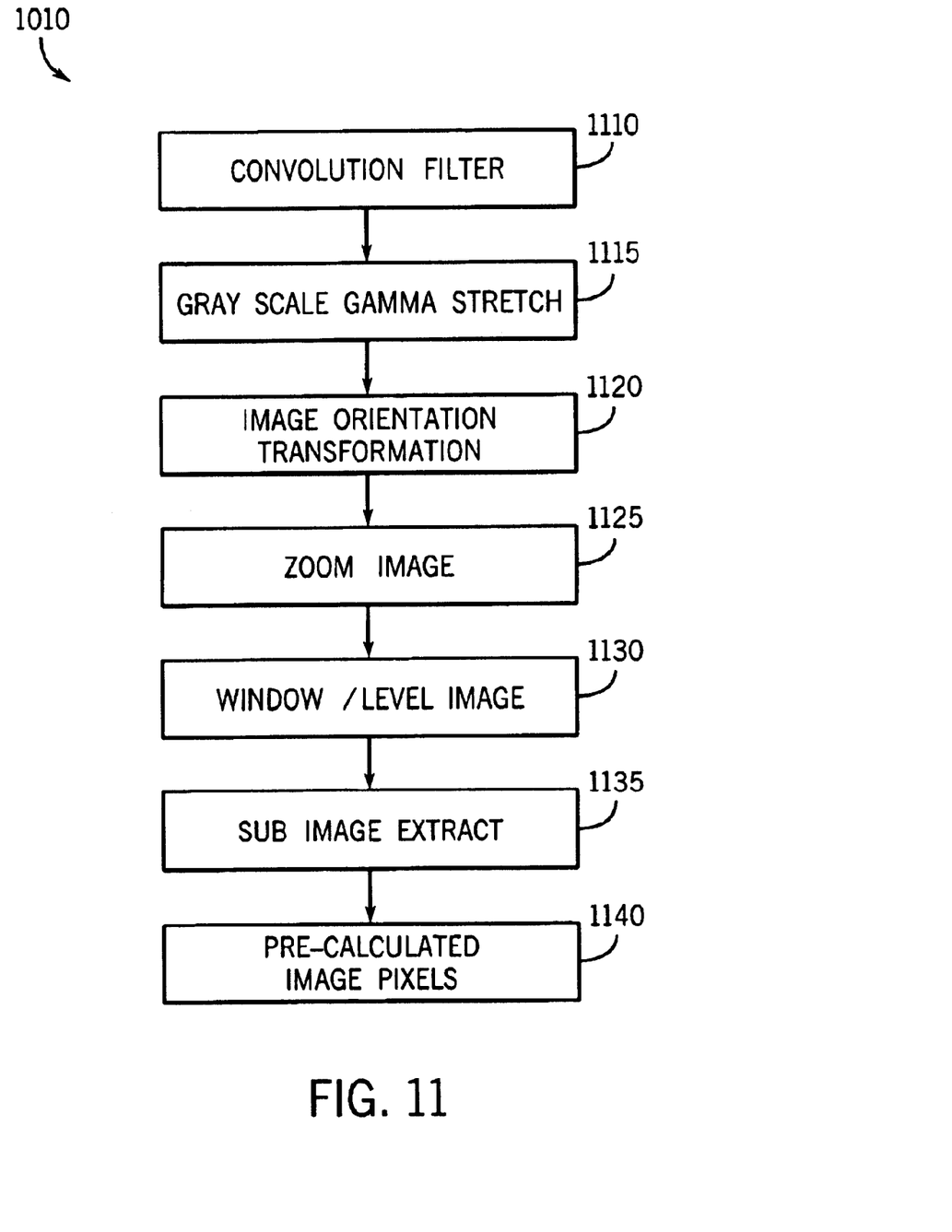
FIG. 11 is a flow chart showing additional exemplary steps of operation of the medical imaging system of FIG. 1 when operating in the repetitive series rendering mode.

Turning to FIG. 10, an additional flow chart 1000 shows exemplary steps of operation of the imaging system 110 when it is operating in the repetitive series rendering mode of operation of step 245. As shown, upon entering the repetitive series rendering mode of operation, the imaging system 110 pre-calculates pixels for all of the images to be displayed at step 1010, based upon the inputted images and headers as indicated by block 1005. Referring to FIG. 11, the pre-calculation of pixels includes performing a convolution filter operation at step 1110, a gray scale gamma stretch operation at step 1115, an image orientation transformation at step 1120, a zoom image operation at step 1125, a window/level image operation at step 1130, and a subimage extract operation at step 1135, at which point the pre-calculation of image pixels is completed as indicated by block 1140. Each of steps 1110–1135 correspond to steps 310–335, respectively.

Returning to FIG. 10, the imaging system 110 next proceeds to step 1015, at which the values of pixels are adapted to the specifications of the output device on which the image is to be displayed in an output adapter operation, and then at step 1020 the image is displayed. Unlike the other modes of operation discussed above, the repetitive series rendering mode of operation by its nature involves the repeated adjustment of the image to be displayed at step 1030. Steps 1030, 1015 and 1020 are repeated to display adjusted images as long as the imaging system 110 does not exit the repetitive series rendering mode of operation at step 1025, as a result of either the completion of the display of the series of images or the receipt of a command from the operator or a system device to switch to a different mode of operation (or otherwise leave the repetitive series rendering mode of operation). Because each of the images of the series of images are very similar in terms of their characteristics, particularly their window/level, pan and zoom settings, the steps of FIG. 11 need only be performed once, and thus the display of the series of images can take place at a rapid pace. Once the imaging system 110 exits the repetitive series rendering mode of operation, the imaging system returns to whatever program was previously being performed as indicated by block 1035.

Thus, in accordance with the steps of FIGS. 2–11, the imaging system 110 is able to display images, and change the display of images, in a variety of modes. Although the imaging system 110 is capable of operating in the standard image rendering mode if one of the other specialized modes is not selected, the imaging system provides special benefits in terms of the speed with which it can adjust the display of images by operating in one of the interactive window/level rendering mode, the interactive pan rendering mode, the interactive zoom rendering mode, or the repetitive series rendering mode. Indeed, in many embodiments, the imaging system allows for real-time interaction between an operator and the imaging system in terms of the response of the displayed images to commands from the operator. Also, the imaging system allows for the rapid display of sequences of images in the repetitive series rendering mode so that differences between the various images become more apparent to the operator.

Although the particular steps shown in each of FIGS. 2–11 are shown in particular orders, the orders provided are only exemplary, and different orders can be employed in different embodiments. For example, with respect to FIG. 2, the imaging system 110 could first determine whether the interactive pan rendering mode has been selected prior to determining whether the interactive window/level mode has been selected. Likewise, with respect to FIG. 5, for example, the image orientation transformation of step 520 could be performed prior to the gray scale gamma stretch operation of step 515. Additionally, not all of the steps shown in FIGS. 2–11 need always be performed. For example, in certain embodiments, the specialized repetitive series rendering mode is not available and consequently steps 240 and 245 and the steps associated with FIGS. 10 and 11 are not performed by the imaging system 110. Also, for example, in FIG. 9, the step 915 for the gray scale gamma stretch operation in certain embodiments need not always be performed.

Further, the particular distributions of operations between the pre-calculation steps 410, 610, 810 and 1010 and the subsequent steps in flow charts 400, 600, 800 and 1000 can vary depending upon the embodiment. For example, with respect to FIGS. 8 and 9, in certain alternative embodiments, the window/level operation at step 925 can be performed after the zoom image operation at step 815 rather than as part of the pre-calculation of pixels at step 810. Although such redistributions of steps between the pre-calculation of pixels steps and the other, repeated steps in FIGS. 4, 6, 8 and 10 can occur depending upon the embodiments, it is envisioned that typically the preferred embodiments of the invention will include as many steps as possible within the pre-calculation steps 410, 610, 810 and 1010. In such embodiments, the number of steps that are repeated when the displayed images are adjusted during operation in each of the interactive modes is reduced, and consequently images can be displayed more quickly.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

What is claimed is:

1. A method for rendering medical images for display on a medical imaging system, the method comprising:
    acquiring an image data set by way of an acquisitioning system;
    entering a special mode of operation that is either an interactive mode of operation or a repetitive series rendering mode of operation, wherein the special mode of operation is the interactive mode of operation, and wherein the interactive mode of operation is an interactive window/level rendering mode;
    pre-calculating pixel values based upon the image data set, wherein the pre-calculating of the pixel values includes:
        applying a convolution filter to the image data set;
        performing a gray scale gamma stretch operation;
        performing an image orientation transformation;
        performing a zoom setting operation; and
        performing a subimage extraction operations;
    displaying an image on an output device based upon the pre-calculated pixel values; and
    altering at least one aspect of the displayed image, wherein the aspect that is altered is a window/level setting of the displayed image, and wherein the altered displayed image continues to be based upon the pre-calculated pixel values.

2. The method of claim 1, further comprising:
    applying a window/level setting to the pre-calculated pixel values;
    performing an output adapter operation;
    determining whether to end the interactive mode of operation; and
    changing the window/level setting if a command is received to perform that change.

3. A method for rendering medical images for display on a medical imaging system, the method comprising:
    acquiring an image data set by way of an acquisitioning system;
    entering a special mode of operation that is either an interactive mode of operation or a repetitive series rendering mode of operation, wherein the special mode of operation is the interactive mode of operation, and wherein the interactive mode of operation is an interactive pan rendering mode;
    pre-calculating pixel values based upon the image data set, wherein the pre-calculating of the pixel values includes:
        applying a convolution filter to the image data set;
        performing a gray scale gamma stretch operation;
        performing an image orientation transformation;
        performing a zoom setting operation; and
        performing a window/level setting operation;
    displaying an image on an output device based upon the pre-calculated pixel values; and
    altering at least one aspect of the displayed image, wherein the aspect that is altered is a pan setting of the displayed image, and wherein the altered displayed image continues to be based upon the pre-calculated pixel values.

4. The method of claim 3, further comprising:
    performing a subimage extraction operation;
    performing an output adapter operation;
    determining whether to end the interactive mode of operation; and
    changing a pan setting if a command is received to perform that change.

5. A method for rendering medical images for display on a medical imaging system, the method comprising:
    acquiring an image data set by way of an acquisitioning system;
    entering a special mode of operation that is either an interactive mode of operation or a repetitive series rendering mode of operation, wherein the special mode of operation is the interactive mode of operation, and wherein the interactive mode of operation is an interactive zoom rendering mode;

pre-calculating pixel values based upon the image data set, wherein the precalculating of the pixel values includes:
applying a convolution filter to the image data set;
performing a gray scale gamma stretch operation;
performing an image orientation transformation; and
performing a window/level setting operations displaying an image on an output device based upon the pre-calculated pixel values; and altering at least one aspect of the displayed image, wherein the aspect that is altered is a zoom setting of the displayed image, wherein the altered displayed image continues to be based upon the pre-calculated pixel values.

6. The method of claim 5 further comprising:
performing a zoom setting operation;
performing a subimage extraction operation;
performing an output adapter operation;
determining whether to end the interactive mode of operation; and
changing the zoom setting if a command is received to perform that change.

7. A method for rendering medical images for display on a medical imaging system, the method comprising:
acquiring an image data set by way of an acquisitioning system;
entering a special mode of operation that is either an interactive mode of operation or a repetitive series rendering mode of operation;
pre-calculating pixel values based upon the image data set;
displaying an image on an output device based upon the pre-calculated pixel values; and
altering at least one aspect of the displayed image, wherein the altered displayed image continues to be based upon the pre-calculated pixel values,
wherein the special mode of operation is the repetitive series rendering mode of operation.

8. The method of claim 7, wherein the pre-calculating of pixels includes:
applying a convolution filter to the image data set;
performing a gray scale gamma stretch operation;
performing an image orientation transformation;
performing a zoom setting operation;
performing a window/level setting operation; and
performing a subimage extract operation.

9. The method of claim 7, further comprising:
performing an output adapter operation;
determining whether to end the repetitive series rendering mode of operation; and
changing the displayed image to a subsequent image of a series of images if it is determined that the repetitive series rendering mode should not be ended.

10. A method for rendering medical images for display on a medical imaging system, the method comprising:
determining whether a specialized mode of operation has been commanded, the specialized mode being selected from the group consisting of an interactive window/level rendering mode, an interactive position rendering mode, an interactive zoom rendering mode, and a repetitive series rendering mode;

if a specialized mode of operation has been commanded:
pre-calculating pixels;
displaying an image based upon the pre-calculated pixels; and
altering the displayed image based upon a command, wherein the altered displayed image is still based upon the pre-calculated pixels;
if a specialized mode has not been commanded, generating a standard image in accordance with a standard mode.

11. The method of claim 10, wherein the generating of the standard image includes:
applying a convolution filter to an image data set;
performing a gray scale gamma stretch operation;
performing an image orientation transformation;
performing a zoom setting operation;
performing a window/level setting operation;
performing a subimage extraction operation; and
performing an output adapter operation.

12. The method of claim 10, wherein image and header information is utilized in pre-calculating the pixels if the specialized mode of operation has been commanded, and is utilized in generating the standard image if the specialized mode of operation has not been commanded.

13. A system for rendering medical images for display on a medical imaging system, the system comprising: an acquisitioning system;
a processing system coupled to the acquisitioning system, wherein the processing system generates a preliminary image data set based upon data from the acquisitioning system; and
an imaging system coupled to the processing system, the imaging system being capable of generating and displaying images based upon the preliminary image data set, and being capable of entering a specialized mode of operation in response to a command;
wherein, when the imaging system enters into the specialized mode, the imaging system pre-calculates pixels based upon the preliminary image data set and further performs a secondary operation to generate and display a first image;
wherein, when the imaging system is operating in the specialized mode, the imaging system is capable of generating and displaying an altered version of the first image based upon the pre-calculated pixels; and
wherein the specialized mode is selected from the group consisting of one of an interactive window/level rendering mode, an interactive position rendering mode, an interactive zoom rendering mode, and a repetitive series rendering mode; and the imaging system operates in a standard mode when the processing system has not entered into any of the specialized modes.

14. The system of claim 13, wherein the pre-calculating of the pixels includes at least one of:
applying a convolution filter to the image data set;
performing a gray scale gamma stretch operation;
performing an image orientation transformation;
performing a zoom setting operation;
performing a window/level setting operation; and
performing a subimage extraction operation.

15. The system of claim 13, further comprising at least one of:
applying a window/level setting to the pre-calculated pixel;

performing an output adapter operation;

changing a window/level setting if a command is received to perform that change;

performing a subimage extraction operation;

changing a pan setting if a command is received to perform that change;

performing a zoom setting operation;

changing the zoom setting if a command is received to perform that change;

determining whether to end an interactive mode of operation; and determining whether to end a repetitive series rendering mode of operation.

* * * * *